(12) United States Patent
Anderson et al.

(10) Patent No.: US 7,010,507 B1
(45) Date of Patent: Mar. 7, 2006

(54) SYSTEM PROVIDING FUNDS TO ELECTRONIC TAX FILERS PRIOR TO RECEIPT OF REFUND

(75) Inventors: William P. Anderson, Kansas City, MO (US); John M. French, Sewickley, PA (US)

(73) Assignee: Block Financial Corporation, Kansas City, MO (US)

( * ) Notice: Subject to any disclaimer, the term of this patent is extended or adjusted under 35 U.S.C. 154(b) by 0 days.

(21) Appl. No.: 08/539,110

(22) Filed: Oct. 4, 1995

(51) Int. Cl.
*G06F 17/60* (2006.01)

(52) U.S. Cl. .......................................... 705/31; 705/35

(58) Field of Classification Search ................ 395/231, 395/201, 230; 705/31–44, 1, 30; 235/380
See application file for complete search history.

(56) References Cited

U.S. PATENT DOCUMENTS

| | | | |
|---|---|---|---|
| 3,596,256 A | | 7/1971 | Alpelt |
| 4,718,009 A | * | 1/1988 | Cuervo |
| 4,890,228 A | * | 12/1989 | Longfield ................. 395/231 |
| 5,025,138 A | | 6/1991 | Cuervo |
| 5,025,372 A | | 6/1991 | Burton et al. |
| 5,138,549 A | | 8/1992 | Bern |
| 5,193,057 A | * | 3/1993 | Longfield ................. 395/231 |
| 5,206,803 A | * | 4/1993 | Vitagliano et al. |
| 5,394,487 A | | 2/1995 | Burger et al. |
| 5,644,727 A | | 7/1997 | Atkins |
| 5,724,523 A | * | 3/1998 | Longfield ................. 705/31 |
| 5,739,512 A | | 4/1998 | Tognazzini |
| 5,787,404 A | | 7/1998 | Fernandez-Holmann |
| 5,787,405 A | | 7/1998 | Gregory |
| 5,878,405 A | | 3/1999 | Grant et al. |
| 5,903,876 A | | 5/1999 | Hagemier |
| 5,946,668 A | | 8/1999 | George |
| 5,963,921 A | | 10/1999 | Longfield |
| 5,991,736 A | | 11/1999 | Ferguson et al. |
| 6,019,283 A | | 2/2000 | Lucero |
| 6,064,983 A | | 5/2000 | Koehler |
| 6,070,153 A | | 5/2000 | Simpson |
| 6,105,007 A | | 8/2000 | Norris |
| 6,105,865 A | | 8/2000 | Hardesty |
| 6,182,891 B1 | | 2/2001 | Furuhashi et al. |
| 6,202,052 B1 | | 3/2001 | Miller |
| 6,473,500 B1 | | 10/2002 | Risafi et al. |
| 6,532,450 B1 | | 3/2003 | Brown et al. |

FOREIGN PATENT DOCUMENTS

WO   WO-98/28699 A1   7/1998

OTHER PUBLICATIONS

Union bank Offers assistance Program for Customers Affected by Southland Fires, Business Wire, Oct. 29, 9.*
First Interstate Bank Will Donate $1 Million to Earthquake Relief, Offer Financial Aid to Earthquake Victims, PR Newswire, p0118LA025, Jan. 18, 1994.*
Taxless Innovations Give Postal Service Run for its Money, PR Newswire, 0309SD005, Mar. 9, 1990.*
Giovetti, How to File Your tax Return Electronically, Compute, v15, n4, pS9(3), Apr. 1993.*

(Continued)

*Primary Examiner*—Frantzy Poinvil
(74) *Attorney, Agent, or Firm*—Standley Law Group LLP

(57) ABSTRACT

Electronic data processing system which enables tax filers who electronically file tax returns to early use of their refund amount through an increased credit card credit limit with the tax payers credit card account.

13 Claims, 2 Drawing Sheets

OTHER PUBLICATIONS

Gelllis, Horold C., "How To Get Plugged into Electronic Tax Filing", Journal of Accountancy v171n6 PP56-60, Jun. 1991, Dialog file 15 Accession No. 00553977.*

Mannix, "It's payback time", U.S. News & World Report, 1994, vol. 117, No. 11, p. 77.

Kemp, "Discover Debuts It's First Platinum card", DM News, January 4, 1999, p. 2.

"Discover's Platinum May Stand Out in the Platinum Crowd", Credit Card News, Jan. 15, 1999.

"Your Platinum Partner Certificate Has Arrived", Discover Financial Services, Inc., date unknown.

* cited by examiner

SYSTEM PROVIDING FUNDS TO ELECTRONIC TAX FILERS PRIOR TO RECEIPT OF REFUND

BACKGROUND OF THE INVENTION

This invention relates to a data processing system and method. Particularly this invention relates to a data processing system for the authorization and fast available use of tax refund amounts by way of a tax filer's credit card account. Recently the United States Internal Revenue Service (IRS) has allowed tax filers to electronically file their tax returns. By automating the filing system, the IRS has created capabilities for providing refunds through electronic funds transfer using the U.S. Treasury ACH origination system. Electronic filing enables a tax filer to receive a direct deposit of their refund into an account at an ACH bank which has allowed a tax filer to receive funds from the IRS in as little as 10 days.

Additionally, U.S. Pat. No. 4,890,228 (hereinafter referred to as the Longfield patent), issued in December of 1989, describes a data processing system which shortens the time from filing to receipt of funds to as little as one day. In Longfield, on the basis of tax filer created data, an electronic filing program prepares a 1040, 1040A, or 1040EZ federal tax return acceptable for electronic transmission to the IRS. Concurrently, the tax filer applies for a refund loan, and, on the basis of tax filer provided and approved credit data, a deposit/payment account is opened at an authorized financial institution which issues an advance payment of the tax filer refund. After creation of the deposit/payment account and the payment of the early refund advance, the tax return data which has been electronically filed with the IRS via electronic transmission to IRS computers includes identification of the deposit/payment account designated to receive electronic fund transfer refunds directly from the IRS through the ACH system. The payment of the actual refund from the IRS acts to reimburse the authorized financial institution for the advance payment of the refund it made to the tax filer.

While current electronic filing systems, such as created by the IRS and as described in Longfield, have shortened the time for obtaining a refund payment, there are still problems with obtaining early refunds not solved by these systems. For example, in Longfield, a tax filer must act through an authorized financial institution. These institutions charge transaction fees for their participation which when expressed as an APR may be very high. These transaction fees are deducted from the advance payment of the refund. These transaction fees and resulting high APR's have deterred many tax filers from participating in the system described in Longfield. Only tax filers who need the early refund right away tend to participate in the early refund system of the Longfield invention. Additionally, many financial institutions will not participate in these programs due to the risk of not obtaining reimbursement for the payments made to the tax filers from the deposit/loan accounts. This risk has recently been increased due to the United States government's refusal to continue to provide the Direct Deposit Indicator which served to warn the participating authorized financial institutions that the indicated refund might not be deposited electronically into the deposit/loan account.

In contrast, the system of the present invention shortens the time that funds from a tax refund are made available to the tax filer to as little as one day while lowering transaction costs to tax filers and lowering risks to participating financial institutions. These advantages will lead to increased participation in electronic filing by tax filers, who have not relied on electronic filing in the past. Furthermore, conservative financial institutions may elect to participate due to decreased risk of not being reimbursed for the funds made available to the tax filer. The system of the present invention may also have the beneficial effect of encouraging the filing of tax returns as well as increasing the accuracy of the returns.

SUMMARY OF THE INVENTION

It is therefore the object of this invention to provide a system and method for providing a faster access to funds through the electronic filing of tax returns.

It is another object of this invention to provide a system and method for providing a faster access to funds which can be utilized through a tax filer's credit card account.

It is still another object of the invention to provide a system and method for providing a faster access to funds which shortens the elapsed time to as little as one day or less while lowering transaction costs and risks to participating financial institutions.

These and other objects of the invention, as will be apparent herein, are accomplished by the method of the present invention, comprising, in a preferred embodiment the steps of: creating an agreement between the tax filer and a credit card company or bank; inputting personal, tax and credit card account information to an electronic data processing system; creating electronic tax return files from the inputted tax data; creating a deposit/payment account file related to the inputted data at an authorized financial institution; transmitting the electronic tax data files to a relevant taxing authority, preferably via a computer network; authorizing the increase of the tax filer's credit card credit limit by the anticipated refund amount; facilitating receipt by the authorized financial institution of electronic funds payment from the relevant taxing authority in the amount of the tax filer's refund; crediting the tax filer's credit card account balance by the refund amount upon the receipt of the refund amount from the taxing authority; and decreasing the tax filer's credit card credit limit by the amount of the electronic funds payment.

In the preferred embodiment, the fast refund amount availability method further comprises the step of processing the tax return data files and the deposit/payment account files for the authorizing of said early refund.

It is further preferred that the method comprise the steps of deducting processing fees from the credit card account and transmitting the deducted amount by electronic funds transfer.

The method of the present invention can be accomplished electronically by data processing and transmission means known to the art. The specific embodiment of the data processing system of the present invention is disclosed in the form of data, program and schematic flow diagrams which enable a skilled programmer to write programs in a variety of computer languages which can be executed on a variety of data processing machines.

DETAILED DESCRIPTION OF THE INVENTION

Figure 1:
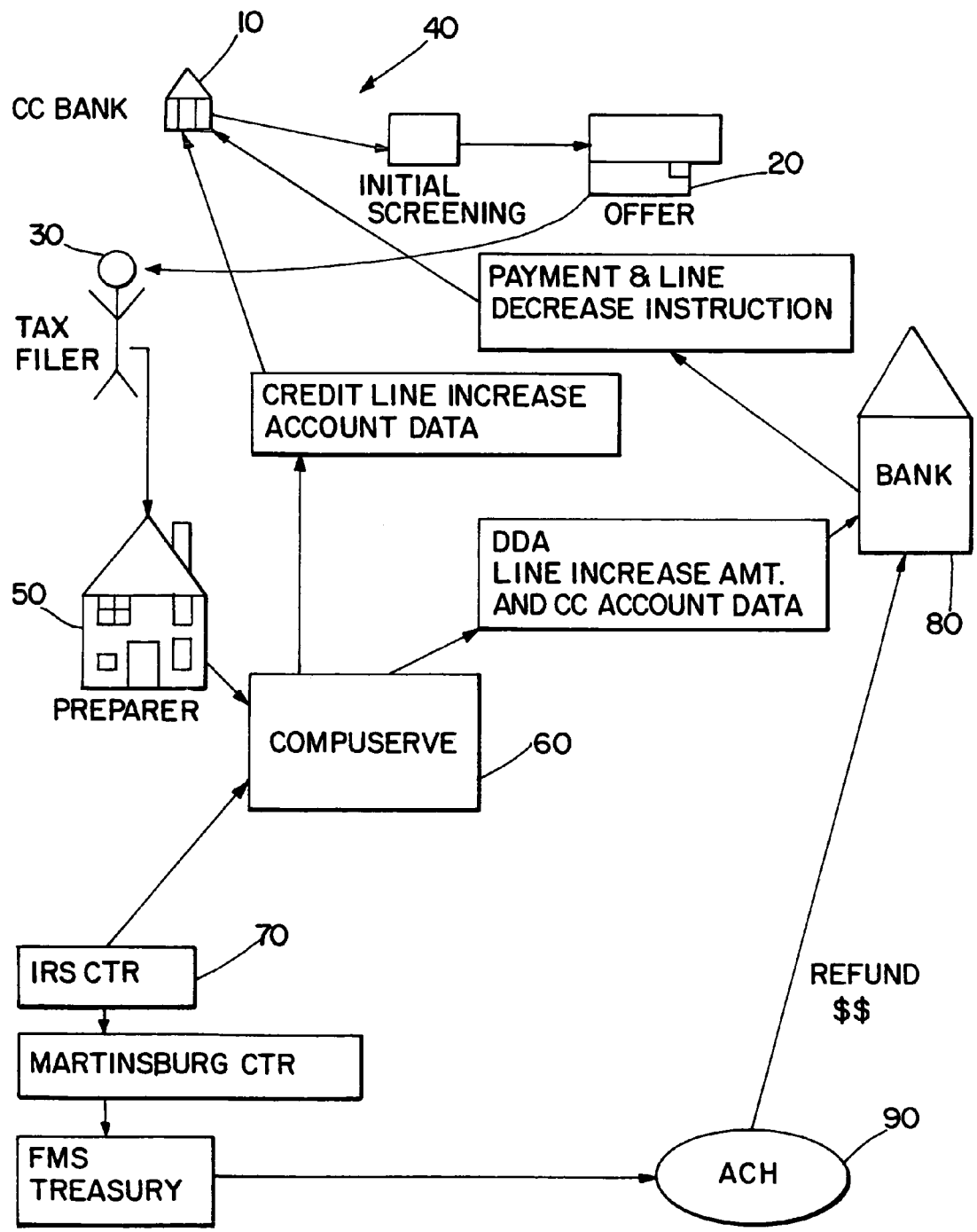
FIG. 1 is a data flow diagram of the present invention.
Figure 2:
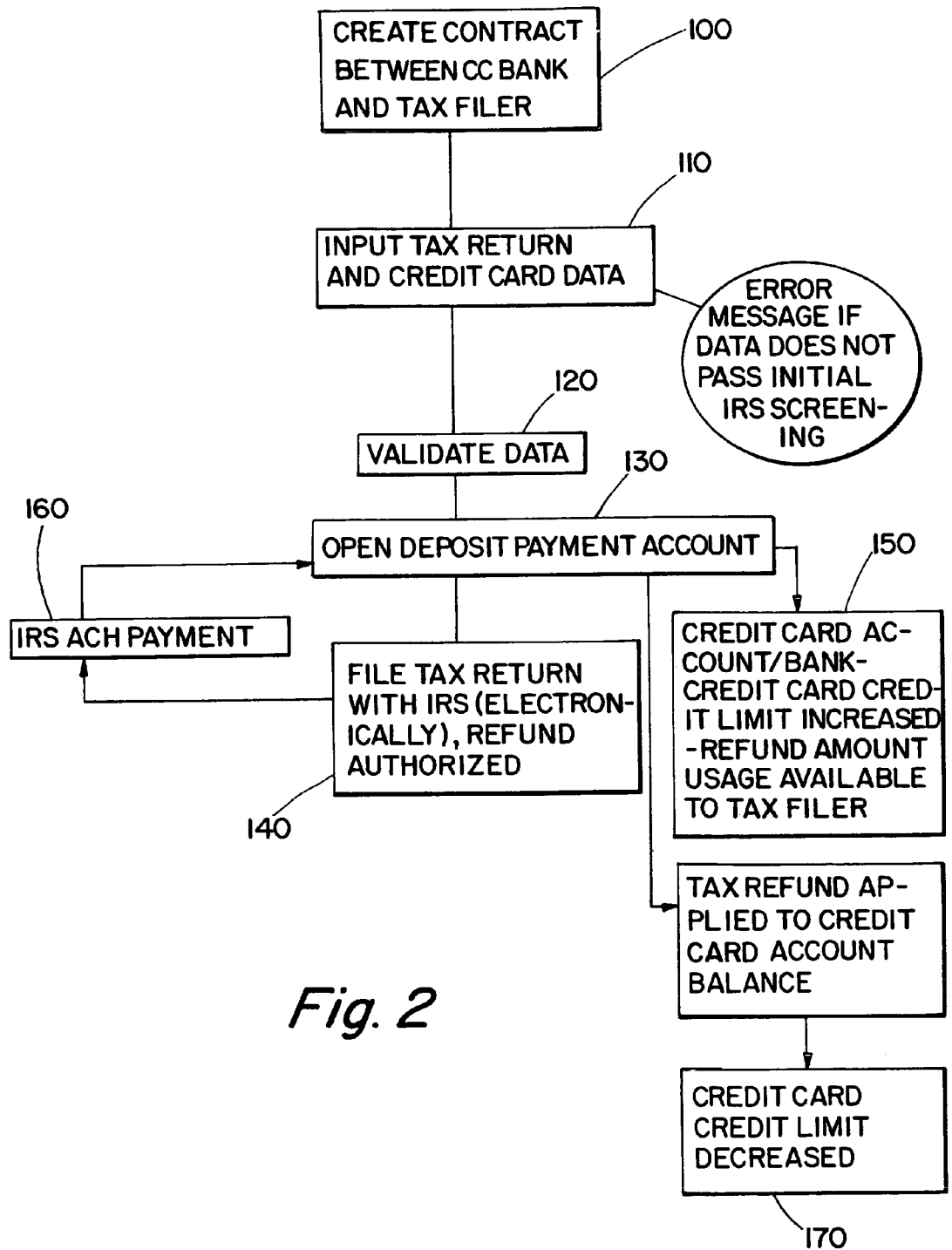
FIG. 2 is a schematic flow diagram of the data processing functions of the present invention.

Referring in more particularity to FIGS. 1 and 2, there is shown in data flow diagram form an overall depiction of the data flow process of the present invention and a schematic flow diagram of the data processing functions of the present invention, respectively. The tax filer 30 enters into an early refund agreement 20, 100 with his or her credit card bank 10. The credit card bank 10 agrees to increase the tax filer's credit card credit limit by that refund amount. In consideration, the tax filer agrees to allow the credit card bank to credit his or her account with the tax refund amount and to pay interest and/or transaction fees when incurred as incorporated into their cardholder agreement. Other additional terms may be incorporated into the agreement 20 as the parties wish.

In the preferred embodiment, the terms of the agreement 20 will be provided to the tax filer 30 as an offer to enter into the agreement 20. The tax filer 30, upon entering into the agreement 20 with his or her credit card bank can then initiate the data submission process. An input means 40 is utilized for inputting the relevant information 110. Relevant information may include, but is not limited to, tax filer personal information (such as name, social security number, etc.), credit card information, tax filer tax return information (such as wages earned, etc.), preparer information, and refund amount information. In the preferred embodiment, the input means 40 comprises a personal computer with data processing and transmission capabilities. A tax filer may obtain the services of an authorized preparer 50 who may assist in data input processing and provide a software system for enabling electronic filing.

Once data input is complete, the data is transmitted to a remote data processing center 60, preferably via a computer network such as an information service provider (for example, CompuServe®), where a program process is executed to create electronic tax return files which are in a form accepted by the IRS or relevant taxing authority. For example, a Tax Preparation Software (TPS) for preparing 1040, 1040A and 1040EZ tax returns in an electronic format acceptable to the IRS may be used. Several such software packages are in existence today and in use at tax preparation facilities, such as H&R Block®. The program should also check for errors in data entry and prompt the tax filer as to required tax forms or schedules which need filing. The Tax Preparation Software (TPS) is used by the tax preparer to generate the electronic tax return. The typical information needed for insertion by the tax preparer into the electronic tax return is basically the same as needed for a non-electronic tax return including such information as the tax filer's W2(s) and other miscellaneous tax liabilities and assets information.

It is necessary to validate tax return data and credit card data 120. Validation of tax return data, including mathematical checking, can be performed by a data processor means at the IRS Center 70 or by the remote processing center 60. Tax return validation may also be accomplished in-part by the Tax Preparation Software (TPS).

Once tax return data and credit histories are preferably validated, a deposit/payment account 130 is created at an authorized financial institution 80. In the present invention the credit card company may perform a screening of its customers before inviting participation into the program. The IRS will issue the tax refund directly, by way of electronic funds transfer using the Treasury ACH origination system 90, to the deposit/payment account. Currently, the IRS is prohibited from paying tax refunds directly to credit card accounts.

With the creation of the deposit/payment account, the tax return data is electronically filed with the IRS or relevant taxing authority 140. In the preferred embodiment, the tax return data is transmitted electronically to the relevant IRS data processing means. Along with the tax return data, data identifying the tax filer's particular deposit/payment account is transmitted so that tax refunds can be made to the appropriate account at the authorized financial institution 80.

Additionally, upon validation, a program means of the remote processing center initiates a credit card credit limit increase in the amount of the expected refund, which can occur as early as one day or less from the inputting of the tax filer's data. The tax preparer will arrange for a deposit tax refund account to be opened at a specified ACH bank and will notify the tax filer due the tax refund that their credit card credit limit has been increased by the expected tax refund amount and is now available for use.

In the preferred embodiment, the credit card credit limit increase is made less tax preparation and filing fees and the tax filer's credit card credit limit is increased by the amount of the expected refund 150. The credit card credit limit is increased so that any charge to the credit card which takes advantage of the funds made available will not act to exceed the previously existing credit card credit limit. The tax filer will be charged interest and/or fees to the extent that the credit card credit limit increase is utilized preferably in the amount or percents as defined in the cardholder agreement. This early refund system can result in lower transaction costs (i.e., finance charges) assessed to the tax filer as compared to prior systems. Additionally, the system of the present invention decreases the risk of participating financial institutions, as they no longer bear the risk of nonpayment from the IRS or other taxing authority. This has the advantageous effect of increasing financial institution participation as well as encouraging the entry of truthful and accurate tax information by tax filers desiring early refunds.

Upon processing the tax filer's tax return, the IRS transmits the refund, by electronic funds transfer, to the tax filer's deposit/payment account 160. The authorized financial institution 80, where the account is located, then makes funds available to the credit card account 10 of the tax filer and decreases the credit card credit limit 170 by the previously increased amount.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A method for increasing a credit card credit limit for a taxpayer credit card account based on an anticipated tax refund amount, comprising the steps of:

electronically obtaining taxpayer information comprising personal information, tax information, and credit card information, said taxpayer information obtained by an electronic data processing system;

creating electronic tax return files from said taxpayer information through the input of said personal information, credit card information, and taxpayer information;

transmitting said electronic tax return files to a relevant taxing authority;

transmitting from said electronic data processing system to a credit card issuer an anticipated tax refund amount;

increasing said credit card credit limit for said taxpayer's credit card account by said credit card issuer, based on said anticipated tax refund amount, wherein said increase is made prior to tax return processing;

creating a deposit/payment account designated to receive by electronic funds transfer said tax refund from said relevant taxing authority;

transferring said tax refund from said relevant taxing authority to said deposit/payment account;

applying transaction fees to said taxpayer's account in accordance with an agreement for said taxpayer's account;

applying a payment based on said anticipated tax refund amount to said taxpayer's credit card account by making funds in said deposit/payment account available to said credit card issuer, and;

decreasing said credit card credit limit based on said anticipated tax refund amount after said payment is applied.

2. The method of claim 1 further comprising the step of validating said taxpayer information and credit card information.

3. A system for increasing a credit card limit based on an anticipated tax refund for a taxpayer comprising:

an authorized financial institution deposit/payment account adapted to receive tax return data from a tax authority, said account maintained at a first computer;

an electronic data processing system for preparing and submitting tax return data by inputting personal, credit card, and tax data to said electronic data processing system from a plurality of taxpayers to a tax authority;

a first electronic record at said electronic data processing system comprising credit card data including an identifier and a credit limit for said taxpayer;

a second electronic record at said electronic data processing system comprising tax return data from said taxpayer, said tax return data including an anticipated refund amount and said credit card identifier for said taxpayer and said tax return data from said taxpayer entered into said electronic data processing system;

a first communication link for transmitting said anticipated refund amount and said credit card identifier from said electronic data processing system to a second computer for said credit card data;

a third electronic record comprising an increased credit limit by a credit card issuer associated with said credit card data, said increased credit limit based on said anticipated refund amount;

a second communication link for transmitting a refund from said tax authority to said authorized financial institution account; and a third communication link for transmitting said refund from said authorized financial institution deposit/payment account to said second computer;

a fourth electronic record comprising an account balance associated with said credit card data, said anticipated refund amount applied as a payment to said account balance; and a fifth electronic record comprising a decreased credit limit associated with said credit card data, said decreased credit limit based on said anticipated refund amount and applied after said payment to said account balance.

4. The system of claim 3 further comprising a software program means at said electronic processing system for validating said credit card data and tax return data.

5. The system of claim 3 further comprising a means for charging processing fees to the credit card account and for transmitting said fees by electronic funds transfer.

6. A method for increasing a credit card limit for a taxpayer's credit card account, comprising the steps of:

preparing electronic tax return data comprising personal, credit card, and tax data for said taxpayer, said electronic tax return data inserted into tax preparation software operating on an electronic data processing system;

determining an anticipated refund amount based on said electronic taxpayer tax return data;

transmitting from said electronic data processing system to a credit card issuer computer system said anticipated refund amount;

increasing said credit card limit for said taxpayer's credit card account by said credit card issuer based on said anticipated refund amount;

creating a deposit/payment account at an authorized financial institution, said deposit/payment account designated to receive electronic fund transfer refunds from a taxing authority;

transferring said electronic tax return data to said taxing authority;

receiving from said taxing authority at said deposit/payment account at said authorized financial institution said taxpayer's refund; and applying a payment in the amount of said anticipated refund to said taxpayer's credit card account by making funds in said deposit/payment account available to said credit card issuer; and reducing said credit card limit for said taxpayer's credit card account based on said anticipated refund amount after said payment is applied.

7. The method of claim 6 wherein the step of increasing said credit card limit based on said anticipated refund amount comprises the step of increasing said credit card limit by less than said anticipated refund amount.

8. An electronic data processing system for the authorization and faster use of tax refund amounts by way of a tax filer's credit card account, comprising:

an electronic data processing means, wherein said processing means executes programmed arithmetic and logical processes and stores data;

an input means for inputting personal, credit card, and tax data to said electronic data processing means;

a program means executable by said electronic data processing means for processing inputted tax data from said input means and for creating electronic tax return data files required by the relevant taxing authority;

a program means executable by said electronic data processing means for processing credit card data inputted from said input means, for creating deposit/payment account files for said tax filer in an authorized financial institution, and for transmitting said tax filer's account data to said authorized financial institution;

a program means executable by said electronic data processing means for processing said tax return data files and said deposit/payment account files and for transmitting said tax filer's tax return data to said relevant taxing authority and for authorizing receipt by said authorized financial institution of electronic funds data from said relevant taxing authority;

a program means executable by said electronic data processing system for processing said tax return files and authorizing an increase of said tax filer's credit card credit limit by said authorized financial institution, based on said anticipated refund amount, wherein said increase may be utilized prior to tax return processing and tax refund payment by said tax collecting authority; and a program means controlled by said authorized financial institution for decreasing said tax filer's credit card credit limit by said anticipated refund amount, and for applying a payment to said tax filer's credit card account in the amount of said refund upon the receipt of said refund amount from said taxing authority.

9. The electronic data processing system of claim 8 further comprising, a program means for validating said credit card and tax data.

10. The electronic data processing system of claim 8 further comprising, a means for charging processing fees to the credit card account and for transmitting said fees by electronic funds transfer.

11. The electronic data processing system of claim 8 further comprising, a second electronic data processing means controlled by said relevant taxing authority, wherein said processing means executes programmed arithmetic and logical processes and stores data; and a third electronic data processing means controlled by said authorized financial institution, wherein said processing means executes programmed arithmetic and logical processes and stores data.

12. A method for the authorization and faster use of tax refund amounts by way of a tax filer's credit card account, comprising:

inputting personal, tax, and credit card account information to an electronic data processing system;

creating electronic tax return files from said inputted tax data;

processing said electronic tax return files to determine an anticipated refund amount;

transmitting said electronic tax data files to a relevant taxing authority;

authorizing an increase of a credit card credit limit for said tax filer's credit card account by transmitting said anticipated refund amount to a credit card issuer wherein said increase of said credit card credit limit is made prior to tax return processing and payment of a tax refund by said relevant tax authority;

creating a deposit/payment account designated to receive by electronic funds transfer said tax refund from said relevant taxing authority;

transferring said tax refund from said relevant taxing authority to said deposit/payment account;

applying a payment in the amount of said refund to said tax filer's credit card account upon the receipt of said refund amount from said relevant taxing authority;

reducing said tax filer's credit card limit by said refund amount after said payment is applied; and applying transaction fees associated with said crediting to said tax filer's account in accordance with an agreement for said tax filer's account.

13. The method for the authorization and faster use of tax refund amounts of claim 12 further comprising the step of processing said tax return data files to validate the personal, tax, and credit card account information.

* * * * *